US008869252B2

(12) United States Patent
Asokan et al.

(10) Patent No.: US 8,869,252 B2
(45) Date of Patent: Oct. 21, 2014

(54) METHODS, APPARATUSES, AND COMPUTER PROGRAM PRODUCTS FOR BOOTSTRAPPING DEVICE AND USER AUTHENTICATION

(75) Inventors: Nadarajah Asokan, Espoo (FI); Jan-Erik Ekberg, Vantaa (FI); Antti Kiiveri, Oulu (FI); Olli Muukka, Tampere (FI)

(73) Assignee: Nokia Corporation, Espoo (FI)

( * ) Notice: Subject to any disclaimer, the term of this patent is extended or adjusted under 35 U.S.C. 154(b) by 1395 days.

(21) Appl. No.: 12/123,135

(22) Filed: May 19, 2008

(65) Prior Publication Data

US 2011/0093938 A1   Apr. 21, 2011

(51) Int. Cl.
*H04L 9/32* (2006.01)
*G06F 21/31* (2013.01)
*H04L 29/06* (2006.01)

(52) U.S. Cl.
CPC ........... *H04L 63/061* (2013.01); *H04L 2209/80* (2013.01); *H04L 63/0815* (2013.01); *H04L 63/0823* (2013.01); *H04L 9/3263* (2013.01); *G06F 21/31* (2013.01)
USPC ............ 726/7; 726/4; 726/5; 726/6; 713/156; 713/175; 713/176; 380/229; 380/282; 380/30

(58) Field of Classification Search
CPC ......... G06F 21/33; G06F 21/31; G06F 21/64; H04L 9/3263; H04L 63/0823
USPC ............. 713/156, 175, 176; 726/1, 7; 380/30, 380/59, 46, 270, 288; 705/71–76
See application file for complete search history.

(56) References Cited

U.S. PATENT DOCUMENTS

| 4,405,829 | A | 9/1983 | Rivest et al. |
| 7,978,850 | B2* | 7/2011 | Sabev ............................. 380/46 |
| 2004/0030901 | A1* | 2/2004 | Wheeler et al. ............... 713/176 |
| 2005/0144144 | A1 | 6/2005 | Graff |

(Continued)

FOREIGN PATENT DOCUMENTS

| EP | 1 175 039 A2 | 1/2002 |
| EP | 1 473 613 A1 | 11/2004 |
| EP | 1 881 665 A1 | 1/2008 |
| GB | 2 403 562 A | 1/2005 |

OTHER PUBLICATIONS

The International Search Report for PCT Application No. PCT/FI2009/050373; Filed May 8, 2009; Date of Completion Sep. 3, 2009; Date of Mailing Sep. 9, 2009.

(Continued)

*Primary Examiner* — Venkat Perungavoor
*Assistant Examiner* — Amir Mehrmanesh
(74) *Attorney, Agent, or Firm* — Alston & Bird LLP

(57) ABSTRACT

An apparatus may include a processor configured to receive a security certificate request from a remote device comprising a public key of the remote device and an authentication credential based upon a legacy authentication mechanism of the remote device. The processor may be further configured to validate the received authentication credential in accordance with the legacy authentication mechanism. The processor may be additionally configured to generate a security certificate for the public key. The processor may be further configured to provide the generated security certificate to the remote device.

40 Claims, 11 Drawing Sheets

(56) References Cited

U.S. PATENT DOCUMENTS

| | | | |
|---|---|---|---|
| 2005/0283608 A1* | 12/2005 | Halcrow et al. | 713/175 |
| 2008/0046581 A1* | 2/2008 | Molina et al. | 709/229 |
| 2008/0065895 A1* | 3/2008 | Liu et al. | 713/176 |
| 2008/0260156 A1* | 10/2008 | Baba et al. | 380/277 |
| 2009/0119742 A1* | 5/2009 | Graziani et al. | 726/1 |
| 2009/0210349 A1* | 8/2009 | Al-Herz et al. | 705/75 |

OTHER PUBLICATIONS

Ben Laurie; "*OpenID: Phishing Heaven,*" http://www.links.org/, pp. 1-10; Apr. 18, 2008.

OpenID Authentication 2.0—Draft 11; specs@openid.net, Jan. 18, 2007; http://openid.net/specs/openid-authentication-2_011.html, pp. 1-48; Apr. 18, 2008.

* cited by examiner

METHODS, APPARATUSES, AND COMPUTER PROGRAM PRODUCTS FOR BOOTSTRAPPING DEVICE AND USER AUTHENTICATION

TECHNOLOGICAL FIELD

Embodiments of the present invention relate generally to mobile communication technology and, more particularly, relate to methods, apparatuses, and computer program products for bootstrapping device and user authentication.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the convenience to users is the authentication of users accessing services over a network. Some of these services have been commonly available for users of personal computers and other computing devices for some time, but recently have become available to mobile terminal users due to the growth in wireless and mobile networking technologies as well as continued development of processing power and miniaturization of high-powered processors and components used in mobile computing devices. Examples of these services include e-mail, instant messaging, multi-player gaming, peer-to-peer file transfer, web browsing, social networking, and photograph hosting.

These services may require users of mobile terminals and other computing devices to establish a user account and to authenticate to each service using a unique sign-on upon each use of a service. The requirement to remember usernames and passwords and to sign-on to a service at each use may be frustrating to some users. Some systems, such as OpenID, have been developed which attempt to provide user authentication credentials and eliminate the need for multiple passwords and login information for services. However, such systems may provide for identifying the user but not secure keying for subsequent communication. Thus these systems may be vulnerable to phishing attacks. Furthermore, these existing systems may require interne connectivity in order for the user identification to be resolvable as the user authentication credentials may have to be resolved by an online credential resolution entity.

Many computing devices are currently built to include hardware-based secure environments. Some computing devices are even required to include such secure environments in order to comply with industry specification standards. For example, terminal devices configured to operate on GSM/3G networks may include such secure environments not only to satisfy regulatory requirements, but also to enable various phone services. These hardware-based secure environments may include authentication mechanisms, also referred to as "legacy authentication mechanisms," which may enable a computing device manufacturer or other entity aware of a device's legacy authentication standards to securely authenticate and communicate with a computing device.

Further, computing devices are often used for personal use by a single user. Therefore, a single device may be correlated with a single user in many circumstances if legacy authentication mechanisms are known to and/or available for use by a service or credentialing provider. Further, providing user credentialing in such a way may allow for secure resolution of user credentials even in ad-hoc networks without an internet connection. Accordingly, it may be advantageous to provide computing device users with methods, apparatuses, and computer program products for bootstrapping device and user authentication so as to transparently and securely authenticate a user to a service based on the user's computing device.

BRIEF SUMMARY

A method, apparatus, and computer program product are therefore provided to provide for bootstrapping device and user authentication. In particular, a method, apparatus, and computer program product are provided to enable, for example, the credentialing of a user device based upon a legacy authentication mechanism of the device. In some embodiments, a security certificate issued to credential the device may be linked to a service user account of a user of the device.

In one exemplary embodiment, a method is provided which may include receiving a security certificate request from a remote device comprising a public key of the remote device and an authentication credential based upon a legacy authentication mechanism of the remote device. The method may further include validating the received authentication credential in accordance with the legacy authentication mechanism. The method may additionally include generating a security certificate for the public key. The method may also include providing the generated security certificate to the remote device.

In another exemplary embodiment, a computer program product is provided. The computer program product includes at least one computer-readable storage medium having computer-readable program code portions stored therein. The computer-readable program code portions include first, second, third, and fourth program code portions. The first program code portion is for receiving a security certificate request from a remote device comprising a public key of the remote device and an authentication credential based upon a legacy authentication mechanism of the remote device. The second program code portion is for validating the received authentication credential in accordance with the legacy authentication mechanism. The third program code portion is for generating a security certificate for the public key. The fourth program code portion is for providing the generated security certificate to the remote device.

In another exemplary embodiment, an apparatus is provided, which may include a processor. The processor may be configured to receive a security certificate request from a remote device comprising a public key of the remote device and an authentication credential based upon a legacy authentication mechanism of the remote device. The processor may be further configured to validate the received authentication credential in accordance with the legacy authentication mechanism. The processor may be additionally configured to generate a security certificate for the public key. The processor may also be configured to provide the generated security certificate to the remote device.

In another exemplary embodiment, an apparatus is provided. The apparatus may include means for receiving a security certificate request from a remote device comprising a public key of the remote device and an authentication credential based upon a legacy authentication mechanism of the remote device. The apparatus may further include means for validating the received authentication credential in accordance with the legacy authentication mechanism. The apparatus may additionally include means for generating a security certificate for the public key. The apparatus may also include means for providing the generated security certificate to the remote device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
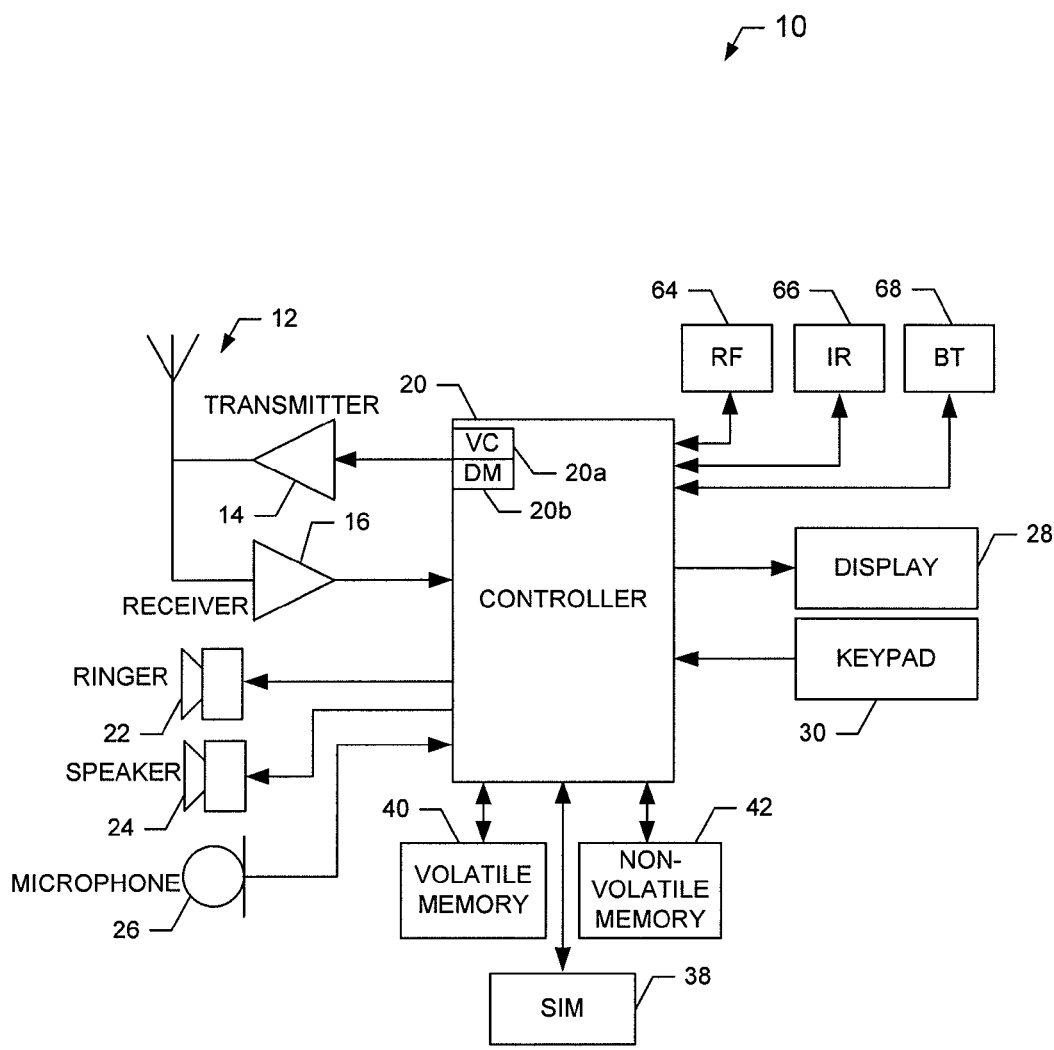
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that may benefit from embodiments of the present invention. It should be understood, however, that the mobile terminal illustrated and hereinafter described is merely illustrative of one type of electronic device that may benefit from embodiments of the present invention and, therefore, should not be taken to limit the scope of the present invention. While several embodiments of the electronic device are illustrated and will be hereinafter described for purposes of example, other types of electronic devices, such as portable digital assistants (PDAs), pagers, laptop computers, desktop computers, gaming devices, televisions, and other types of electronic systems, may employ embodiments of the present invention.

As shown, the mobile terminal 10 may include an antenna 12 in communication with a transmitter 14 and a receiver 16. The mobile terminal may also include a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as UMTS, CDMA2000, WCDMA and TD-SCDMA. The mobile terminal may be additionally capable of operating in accordance with 3.9G wireless communication protocols such as LTE or E-UTRAN. Additionally, for example, the mobile terminal may be capable of operating in accordance with fourth-generation (4G) wireless communication protocols or the like as well as similar wireless communication protocols that may be developed in the future.

Some NAMPS, as well as TACS, mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry required for implementing audio and logic functions of the mobile terminal 10. For example, the controller 20 may be a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 2:
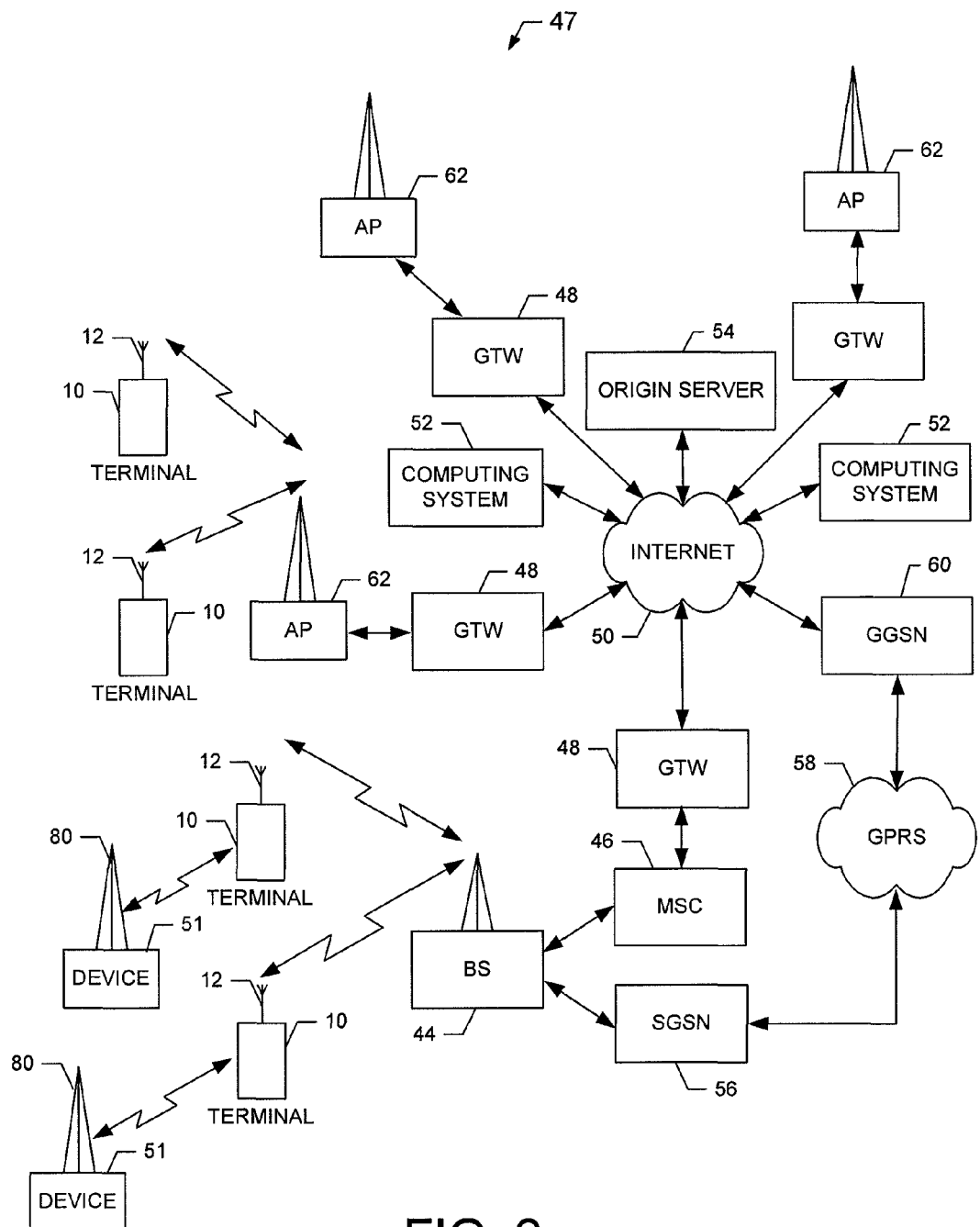
FIG. 2 is a schematic block diagram of a wireless communications system according to an exemplary embodiment of the present invention.

Referring now to FIG. 2, an illustration of one type of system that could support communications to and from an electronic device, such as the mobile terminal of FIG. 1, is provided by way of example, but not of limitation. As shown, one or more mobile terminals 10 may each include an antenna 12 for transmitting signals to and for receiving signals from a base site or base station (BS) 44. The base station 44 may be a part of one or more cellular or mobile networks each of which may comprise elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one typical embodiment, however, the MSC 46 may be coupled to a GTW 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

As shown in FIG. 2, the BS 44 may also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown in FIG. 2 and described herein, it should be appreciated that electronic devices, such as the mobile terminal 10, may be coupled to one or more of any of a number of different networks through the BS 44. In this regard, the network(s) may be capable of supporting communication in accordance with any one or more of a number of first-generation (1G), second-generation (2G), 2.5G, third-generation (3G), fourth generation (4G) and/or future mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as E-UTRAN or a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile terminals (e.g., digital/analog or TDMA/CDMA/analog phones).

As depicted in FIG. 2, the mobile terminal 10 may further be coupled to one or more wireless access points (APs) 62. The APs 62 may comprise access points configured to communicate with the mobile terminal 10 in accordance with techniques such as, for example, radio frequency (RF), Bluetooth™ (BT), infrared (IrDA) or any of a number of different wireless networking techniques, including wireless LAN (WLAN) techniques such as IEEE 802.11 (e.g., 802.11a, 802.11b, 802.11g, 802.11n, etc.), Wibree™ techniques, WiMAX techniques such as IEEE 802.16, Wireless-Fidelity (Wi-Fi) techniques and/or ultra wideband (UWB) techniques such as IEEE 802.15 or the like. The APs 62 may be coupled to the Internet 50. Like with the MSC 46, the APs 62 may be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 and/or origin server 54 across the Internet 50, the mobile terminal 10, computing system 52 and origin server 54 may be coupled to one another and communicate in accordance with, for example, RF, BT, IrDA or any of a number of different wireline or wireless communication techniques, including LAN, WLAN, WiMAX, Wireless Fidelity (Wi-Fi), Wibree™ and/or UWB techniques. One or more of the computing systems 52 may additionally, or alternatively, include a removable memory capable of storing content, which can thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, Wibree™, Wi-Fi, WLAN, WiMAX and/or UWB techniques. In this regard, the mobile terminal 10 may be capable of communicating with other devices via short-range communication techniques. For instance, the mobile terminal 10 may be in wireless short-range communication with one or more devices 51 that are equipped with a short-range communication transceiver 80. The electronic devices 51 may comprise any of a number of different devices and transponders capable of transmitting and/or receiving data in accordance with any of a number of different short-range communication techniques including but not limited to Bluetooth™, RFID, IR, WLAN, Infrared Data Association (IrDA) or the like. The electronic device 51 may include any of a number of different mobile or stationary devices, including other mobile terminals, wireless accessories, appliances, portable digital assistants (PDAs), pagers, laptop computers, motion sensors, light switches and other types of electronic devices.

Figure 3:
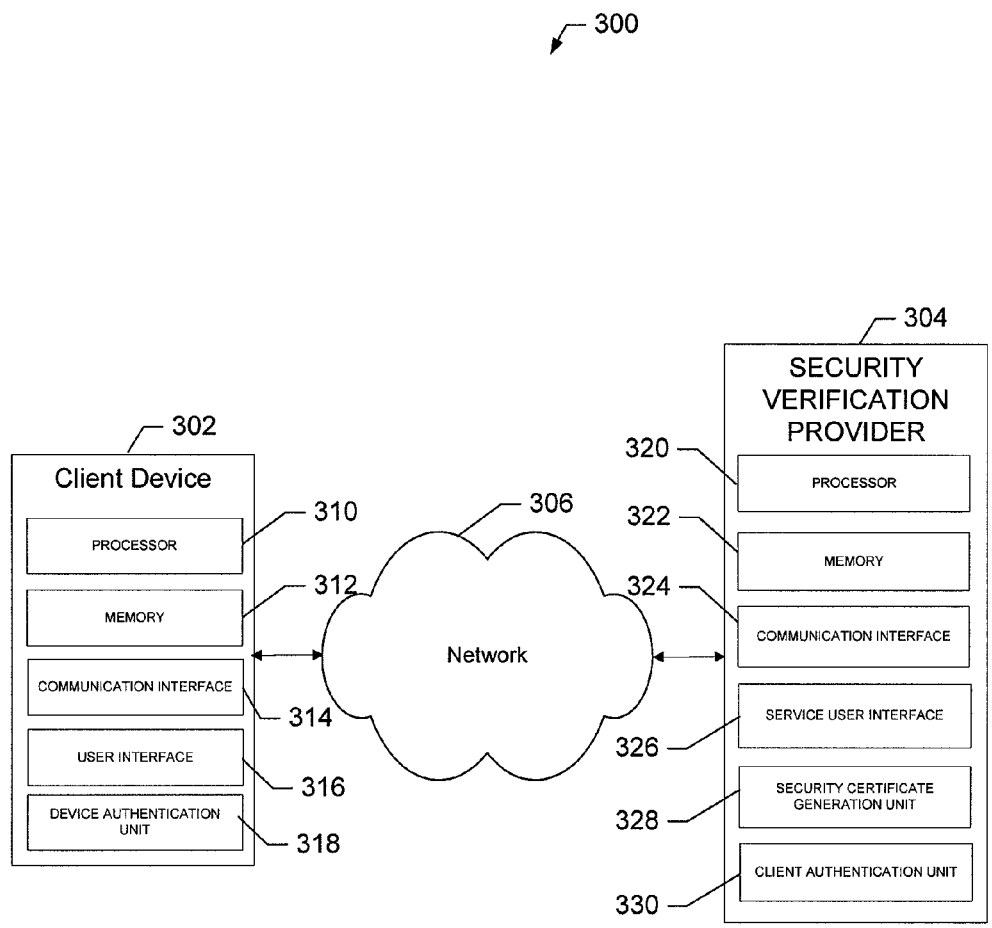
FIG. 3 illustrates a block diagram of a system for providing for bootstrapping of device and user authentication according to an exemplary embodiment of the present invention.

FIG. 3 illustrates a block diagram of a system 300 for providing for bootstrapping of device and user authentication according to an exemplary embodiment of the invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. The system 300 will be described, for purposes of example, in connection with the mobile terminal 10 of FIG. 1 and the system 47 of FIG. 2. However, it should be noted that the system of FIG. 3, may also be employed in connection with a variety of other devices, both mobile and fixed, and therefore, embodiments of the present invention should not be limited to application on devices such as the mobile terminal 10 of FIG. 1. Further, it should be noted that the system of FIG. 3 may be used in connection with any of a variety of network configurations or protocols and is not limited to embodiments using aspects of the system 47 of FIG. 2. It should also be noted, that while FIG. 3 illustrates one example of a configuration of a system for providing for bootstrapping of device and user authentication, numerous other configurations may also be used to implement embodiments of the present invention.

Referring now to FIG. 3, the system 300 may include a client device 302 and a security verification provider 304 configured to communicate with each other over a network 306. The client device 302 may be any computing device and in an exemplary embodiment, may be a mobile terminal 10. The security verification provider 304 may be embodied as any computing device or combination of a plurality of computing devices. In this regard, the security verification provider 304 may be embodied, for example, as a server or a server cluster. The network 306 may be any network over which the client device 302 and security verification provider 304 are configured to communicate. Accordingly, the network 306 may be a wireless or wireline network and in an exemplary embodiment may comprise the system 47 of FIG. 2. The network 306 may further utilize any communications protocol or combination of communications protocols that may facilitate inter-device communication between the client device 302 and the security verification provider 304. Additionally, although the system 300 only illustrates one client device 302 and one security verification provider 304 for purposes of example, the system 300 may include a plurality of client devices 302 and/or security verification providers 304.

The client device 302 may include various means, such as a processor 310, memory 312, communication interface 314, user interface 316, and device authentication unit 318 for performing the various functions herein described. The processor 310 may be embodied in a number of different ways.

For example, the processor 310 may be embodied as a microprocessor, a coprocessor, a controller, or various other processing elements including integrated circuits such as, for example, an ASIC (application specific integrated circuit) or FPGA (field programmable gate array). In an exemplary embodiment, the processor 310 may be configured to execute instructions stored in the memory 312 or otherwise accessible to the processor 310.

The memory 312 may include, for example, volatile and/or non-volatile memory. The memory 312 may accordingly be embodied as volatile memory 40 or non-volatile memory 42 of a mobile terminal 10. The memory 312 may be configured to store information, data, applications, instructions, or the like for enabling the client device 302 to carry out various functions in accordance with exemplary embodiments of the present invention. For example, the memory 312 may be configured to buffer input data for processing by the processor 310. Additionally or alternatively, the memory 312 may be configured to store instructions for execution by the processor 310. As yet another alternative, the memory 312 may comprise one of a plurality of databases that store information in the form of static and/or dynamic information, for example, in association with mobile terminal context information, internet service context information, user status indicators, user activities, or the like. In this regard, the memory 312 may store, for example, encryption keys associated with the client device 302 as well as other devices, security certificates, access tokens, and/or other security and authentication parameters. This stored information may be stored and/or used by the device authentication unit 318 during the course of performing its functionalities.

The communication interface 314 may be embodied as any device or means embodied in hardware, software, firmware, or a combination thereof that is configured to receive and/or transmit data from/to a network and/or any other device or module in communication with the client device 302. The communication interface 314 may be at least partially embodied as or otherwise controlled by the processor 310. In this regard, the communication interface 314 may include, for example, an antenna, a transmitter, a receiver, a transceiver and/or supporting hardware or software for enabling communications with other entities of the system 300, such as the security verification provider 304 via the network 306. In this regard, the communication interface 314 may be in communication with the memory 312, user interface 316, and/or device authentication unit 318. Accordingly, the communication interface 314 may provide means for sending security certificate requests, service access requests, as well as sending and receiving other requests, messages, and responses to and from remote devices such as the security verification provider 304.

The user interface 316 may be in communication with the processor 310 to receive an indication of a user input and/or to provide an audible, visual, mechanical, or other output to the user. As such, the user interface 316 may include, for example, a keyboard, a mouse, a joystick, a touch screen display, a conventional display, a microphone, a speaker, and/or other input/output mechanisms. Accordingly, the user interface 316 may facilitate the access of and interaction with services by a user of the client device 302. Further, the user interface 316 may provide for user interaction with the security verification provider 304 so as to facilitate a credentialing process to receive a security certificate.

The device authentication unit 318 may be embodied as various means, such as hardware, software, firmware, or some combination thereof and, in one embodiment, may be embodied as or otherwise controlled by the processor 310. In embodiments where the device authentication unit 318 is embodied separately from the processor 310, the device authentication unit 318 may be in communication with the processor 310. The device authentication unit 318 may be configured to manage or otherwise interact with a legacy authentication mechanism and one or more secure environments embodied on the client device 302 so that the client device 302 may authenticate itself to a device such as the security verification provider 304 in accordance with protocol of the legacy authentication mechanism. As used herein, "legacy authentication mechanism" refers to a protocol through which a device is configured at the time of its manufacture to authenticate or otherwise identify itself to a remote computing device that is aware of the legacy authentication mechanism protocol. The device authentication unit 318 may additionally provide means for or otherwise be configured to generate public/private encryption key pairs in a secure environment embodied on the client device 302. The public/private encryption key pairs may be generated, for example, in accordance with RSA or other suitable cryptography algorithms. The keys of such a generated key pair will be referred to herein as $PK_D$, designating a public key of the client device 302, and $SK_D$, designating a private or secure key of the client device 302.

The device authentication unit 318 may further provide means, such as the processor 310, for generating and sending a security certificate request to a security verification provider 304. In this regard, the device authentication unit 318 may be configured to generate a security certificate request comprising one or more parameters, including one or more legacy authentication parameters and $PK_D$. As used herein, "parameters" may include one-bit flag indicators, values or indicators comprised of a plurality of bits, as well as files or objects that may be appended to or included in the body of a message. In this regard, a parameter may be included in a message body, signature, or in a message header. These legacy authentication parameters may be selected in accordance with the legacy authentication mechanism of the client device 302 and may comprise one or more of a legacy key pair designated $LPK_D$ and $LSK_D$, a token or other certificate issued on $LPK_D$, or a shared secret key that may also be known to the security verification provider 304. For example, if a shared secret key is utilized, then it may be used with a symmetric key authentication algorithm such as HMAC-SHA. In this regard, one or more of these legacy authentication parameters may comprise an authentication credential. Additionally, the security certificate request may further comprise a parameter proving that generation of $PK_D$ occurred within a specific secure environment trusted by the security verification provider 304. In some embodiments, the device authentication unit 318 may be additionally configured to send an indication of a service user account to the security verification provider. This indication of a service user account may be included with the security certificate request. The security certificate request may be generated and sent at the request of a user of the client device 302, such as may be received via the user interface 316. Additionally or alternatively, the security certificate request may be generated automatically by the device authentication unit 318 or when prompted by a remote device, such as, for example, the security verification provider 304. Such a prompt may be, for example, a device authentication request.

The device authentication unit 318 may be further configured to provide means, such as the processor 310, for responding to a challenge received from the security verification provider 304 in response to a security certificate request. In this regard, the device authentication unit 318 may be configured to calculate a validation token in response to a challenge. The validation token may be calculated as a function based a parameter set that may comprise $LPK_D$, $LSK_D$, any parameters included in the challenge, a token or other certificate issued on $LPK_D$, proof of $SK_D$ generation, $PK_D$, and/or proof that $SK_D$ generation occurred in a secure environment known to the security verification provider 304. The device authentication unit 318 may be further configured to generate a response message comprising the calculated validation token and send the response to the security verification provider 304 via the communication interface 314. In some embodiments, the device authentication unit 318 may encrypt the response, such as by using the security verification provider's public key, herein designated "$PK_S$".

The device authentication unit 318 may be additionally configured to receive a security certificate from the security verification provider 304 and may store the received security certificate in memory, such as in memory 312. In some embodiments the device authentication unit 318 may be further configured to verify a received security certificate. In this regard, the device authentication unit 318 may, for example, verify a received security certificate using a hash of $PK_S$ stored in memory 312. If the security certificate is appropriately verified such that the device authentication unit 318 determines that it was generated by and received from a trusted security verification provider 304, the device authentication unit 318 may store the security certificate in memory 312 and allow for its use for future user authentication. However, if the device authentication unit 318 is unable to verify the security certificate, the device authentication unit 318 may simply discard the security certificate or otherwise render the security certificate unusable.

The device authentication unit 318 may further be configured to generate a service access request, such as in response to a user request received by the user interface 316. In this regard, a service access request may comprise one or more of a security certificate, such as may have been previously requested and received as described above, $PK_D$, and an indication of a requested service. The service access request may be sent to the security verification provider 304 or may be sent to another service provider not shown in system 300 that provides the requested service.

Referring now to the security verification provider 304, in an exemplary embodiment the security verification provider 304 may comprise various means, such as a processor 320, memory 322, communication interface 324, service user interface 326, security certificate generation unit 328, and client authentication unit 330 for performing the various functions described herein. The security verification provider 304 may be embodied in any computing device or plurality of computing devices and may be embodied as a server or server cluster. The security verification provider 304 may be configured to issue security certificates to a client device 302. In some embodiments, the security verification provider 304 may also function as a service provider and/or an account management provider. In embodiments where the security verification provider 304 functions as a service provider, the security verification provider 304 may additionally provide a service to users of client devices 302 and may also verify that a user of a requesting client device 302 is authorized to use a requested service. In embodiments where the security verification provider 304 functions as an account management provider, the security verification provider 304 may serve as a repository of data about registered service users and may accordingly include a number of stored account identifications and passwords associated with registered service users. In this regard, an account management provider may store data about a plurality of registered service users and each registered service user may be associated with a plurality of account identifications, such as user names and password combinations, collectively referred to as a "service user account." Each combination service user account may be associated with a different service. An account management provider may accordingly manage or otherwise communicate with a plurality of service providers so as to provide for a single service sign-on and centralized user authentication manager for users of client devices 302 accessing services from a plurality of service providers.

The processor 320 may be embodied in a number of different ways. For example, the processor 320 may be embodied as a microprocessor, a coprocessor, a controller, or various other processing elements including integrated circuits such as, for example, an ASIC (application specific integrated circuit) or FPGA (field programmable gate array). In some embodiments, the processor 320 may be embodied as a plurality of processors operating in parallel and may be embodied on a single computing device or in a plurality of computing devices, such as in a server cluster. In an exemplary embodiment, the processor 320 may be configured to execute instructions stored in the memory 322 or otherwise accessible to the processor 320.

The memory 322 may include, for example, volatile and/or non-volatile memory. The memory 322 may be configured to store information, data, applications, instructions, or the like for enabling the security verification provider 304 to carry out various functions in accordance with exemplary embodiments of the present invention. For example, the memory 322 may be configured to buffer input data for processing by the processor 320. Additionally or alternatively, the memory 322 may be configured to store instructions for execution by the processor 320. As yet another alternative, the memory 322 may comprise one of a plurality of databases that store information in the form of static and/or dynamic information, for example, in association with mobile terminal context information, internet service context information, user status indicators, user activities, or the like. In this regard, the memory 322 may store, for example, encryption keys associated with the security verification provider 304, legacy authentication information or parameters necessary to authenticate a client device 302 in accordance with legacy authentication mechanisms of the client device 302, references to public keys of client devices 302, service usernames and login information, and/or information about issued security certificates. This stored information may be stored and/or used by the security certificate generation unit 328 and client authentication unit 330 during the course of performing their respective functionalities.

The communication interface 324 may be embodied as any device or means embodied in hardware, software, firmware, or a combination thereof that is configured to receive and/or transmit data from/to a network and/or any other device or module in communication with the security verification provider 304. The communication interface 324 may be at least partially embodied as or otherwise controlled by the processor 320. In this regard, the communication interface 324 may include, for example, an antenna, a transmitter, a receiver, a transceiver and/or supporting hardware or software for enabling communications with other entities of the system 300, such as the client device 302 via the network 306. In this regard, the communication interface 324 may be in communication with the memory 322, service user interface 326, security certificate generation unit 328, and client authentication unit 330. Accordingly, the communication interface 324 may provide means for receiving security certificate requests and service access requests, as well as sending and receiving other requests, messages, and responses to and from remote devices such as a client device 302.

The service user interface 326 may be in communication with the processor 320 to receive an indication of a user input and/or to provide an audible, visual, mechanical, or other output to the user. As such, the service user interface 326 may include one or more elements, such as, for example, a keyboard, a mouse, a joystick, a touch screen display, a conventional display, a microphone, a speaker, and/or other input/output mechanisms. In this regard, the service user interface 326 may provide means for interaction with a user of a client device 302 so as to facilitate verification of the client device 302 and issuance of a security certificate to the client device 302. In embodiments where the security verification provider 304 also serves as a service provider and provides a service, the service user interface 326 may additionally facilitate interaction with and use of one or more services. In an exemplary embodiment in which the security verification provider 304 is embodied as a server, elements of the service user interface 326 may be limited.

The security certificate generation unit 328 may be embodied as various means, such as hardware, software, firmware, or some combination thereof and, in one embodiment, may be embodied as or otherwise controlled by the processor 320. In embodiments where the security certificate generation unit 328 is embodied separately from the processor 320, the security certificate generation unit 328 may be in communication with the processor 320. In some embodiments, the security certificate generation unit 328 may prompt a user of a client device 302 to certify the client device 302. The certificate generation unit 328 may provide means for receiving a security certificate request. In this regard, the security certificate generation unit 328 may be configured to receive a security certificate request comprising a parameter set including an authentication credential as previously described from a client device 302. The security certificate generation unit 328 may receive a security certificate request in response to a device authentication prompt or request previously sent to the client device 302 by the security certificate generation unit 328.

In some embodiments, the security certificate generation unit 328 may be configured to send a challenge to the client device 302. In such embodiments, the security certificate generation unit 328 may further be configured to receive a response comprising a validation token to the challenge from the client device 302 and verify the validation token prior to generating a security certificate. In embodiments wherein the client device 302 is configured to send an encrypted response to the challenge, the security certificate generation unit 328 may be configured to receive the encrypted response and decrypt the response, such as by using an encryption key of the security verification provider 304.

The security certificate generation unit 328 may further provide means, such as the processor 320, for validating the received authentication credential. In this regard, the security certificate generation unit 328 may be configured to validate the authentication credential in accordance with a known legacy authentication mechanism embodied on the client device 302. Validating the authentication credential in accordance with the known legacy authentication mechanism may comprise validating that the client device 302 is a compliant device, i.e. that the client device 302 is of a type known and trusted by the security certificate generation unit 328, validating that $PK_D$ matches the representation in the parameters covered by the legacy mechanism, and/or validating that $PK_D$ was created in a known and trusted secure environment. The security certificate generation unit 328 may validate that the client device 302 generated $PK_D$ in a known and trusted secure environment based upon an assertion or other proof sent by the client device 302, such as in response to a challenge. In embodiments where the security verification provider 304 is configured to receive security certificate requests from client devices 302 that may use more than one legacy authentication mechanism, the security certificate generation unit may be further configured to determine the legacy authentication mechanism used by the client device 302 based on the authentication credential or other parameters received in the security certificate request.

The security certificate generation unit 328 may further provide means, such as the processor 320, for generating a security certificate for the received public key $PK_D$. In this regard, the security certificate generation unit 328 may be configured to generate a security certificate comprising a plurality of attributes. For example, the security certificate generation unit 328 may be configured to generate a security certificate comprising an attribute specifying a model of the client device 302 on which $PK_D$ resides, an attribute specifying a security level of $PK_D$ based upon the security level of the secure environment of the client device 302 on which it was generated, and/or an attribute specifying allowed use permissions of the security certificate. The allowed use permissions of the security certificate may include, for example, services which the security certificate allows a user of the client device 302 to access and an extent of allowed access.

The security certificate generation unit 328 may further provide means, such as the processor 320, for linking a generated security certificate to a service user account. In this regard, the security certificate generation unit 328 may be further configured to receive an indication of a service user account, such as in conjunction with the security certificate request. The indication may comprise, for example, a service user account username and password. The security certificate generation unit 328 may be configured, for example, to link the generated security certificate to the service user account by storing a reference to $PK_D$ of the client device 302 in association with the indicated service user account in memory 322. In some embodiments, the security certificate generation unit 328 may be configured to link multiple security certificates to a service user account. In this regard, a single user having a service user account may use a plurality of client devices 302 to access his service user account. Accordingly, the user may certify each client device 302 so that a security certificate is generated and issued to each by the security certificate generation unit 328. Each of those security certificates and by extension each client device 302 of the user may then be linked to the user's service user account. In such embodiments, the service user interface 326 may be further configured to provide a user with means, such as a graphical user interface that may be accessed by a client device 302, to manage his service user account associations so that the user may add and remove client devices 302 linked to his service user account.

The client authentication unit 330 may be embodied as various means, such as hardware, software, firmware, or some combination thereof and, in one embodiment, may be embodied as or otherwise controlled by the processor 320. In embodiments where the client authentication unit 330 is embodied separately from the processor 320, the client authentication unit 330 may be in communication with the processor 320. It will be appreciated that while the exemplary embodiment illustrated in FIG. 3 includes a client authentication unit 330 in the security verification provider 304, in some embodiments the security verification provider 304 may not include a client authentication unit 330. The client authentication unit 330 may be embodied on any computing device that serves as a service provider or an account management provider and accordingly, may be included in a security verification provider 304 in embodiments of the invention where the security verification provider also serves as a service provider and/or account management provider. Further, a client device 302 may include a client authentication unit 330, such as in embodiments where a client device 302 is engaged in communications with remote computing devices, such as additional client devices 302 over an ad hoc network. The client authentication unit 330 may provide means, such as the processor 320, for receiving a service access request comprising a security certificate and a public key $PK_D$ from a client device 302, determining a service user account based upon an association between $PK_D$ and the service user account, verifying that the client device 302 has authorization to access the requested service, and providing access to the requested service to the client device 302. In this regard, the client authentication unit 330 may be configured to receive a service access request message from a client device 302 and parse or otherwise extract the $PK_D$ parameter from the service access request and determine an associated service user account, such as based upon an association stored in memory 322 between a service user account and the received $PK_D$. The client authentication unit 330 may be further configured to verify that the requesting client device 302 is authorized to access the requested service. The client authentication unit 330 may perform this verification based upon an attribute included in the security certificate that indicates permissible uses for the security certificate. The client authentication unit 330 may be further configured to provide access to the requested service to the client device 302 if it verifies that the requesting device has permission to access the requested service.

Figure 4:
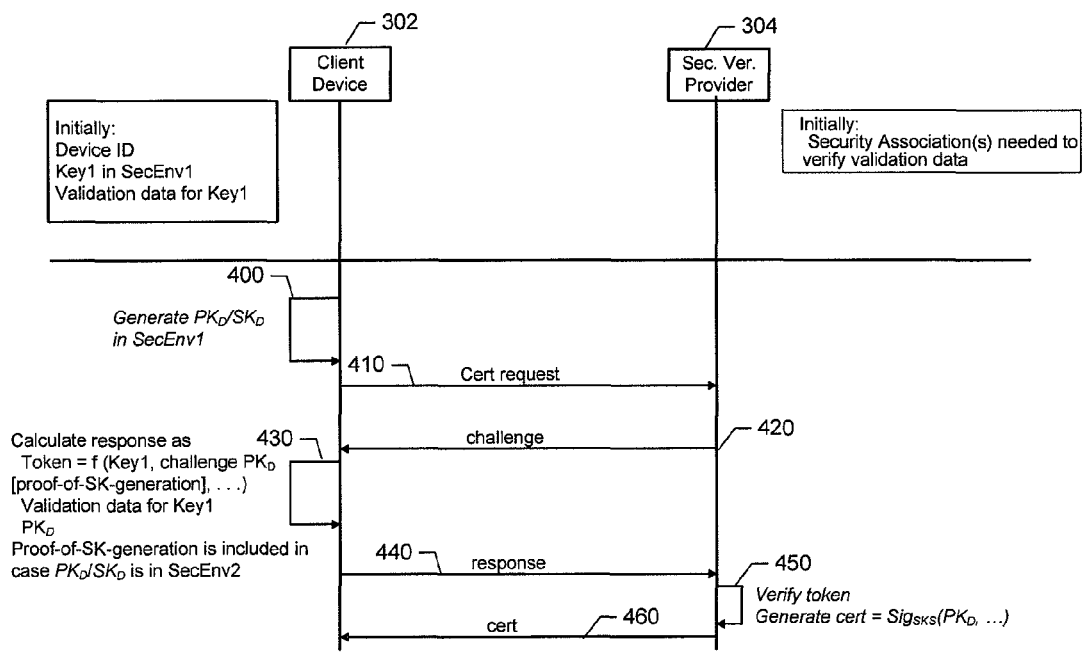
FIGS. 4-6 are signaling diagrams illustrating communications that may occur while bootstrapping device and user authentication according to exemplary embodiments of the present invention.
Figure 5:
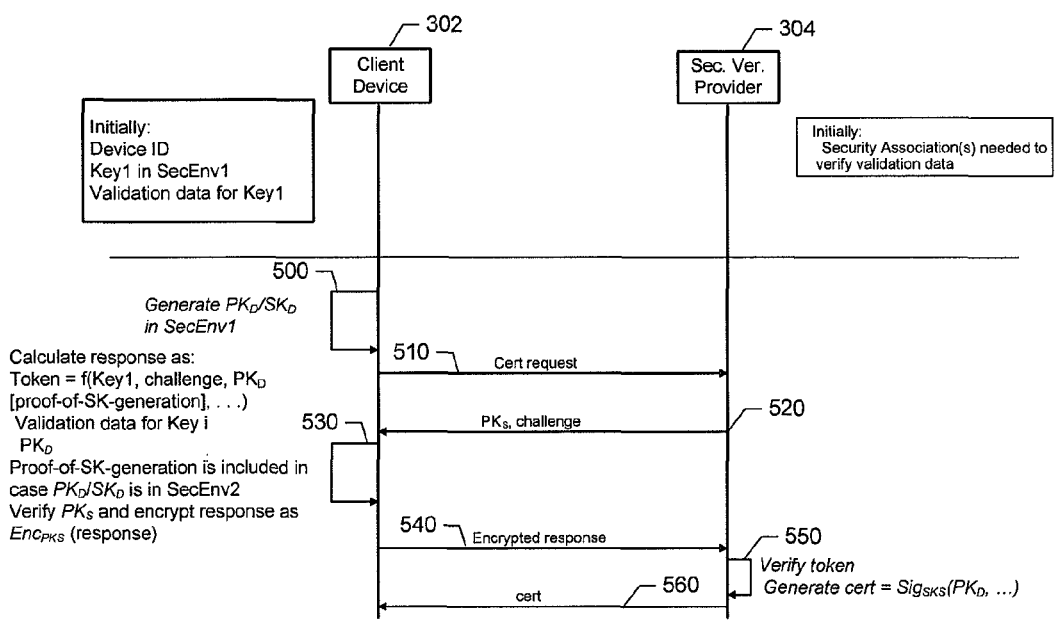
Figure 6:
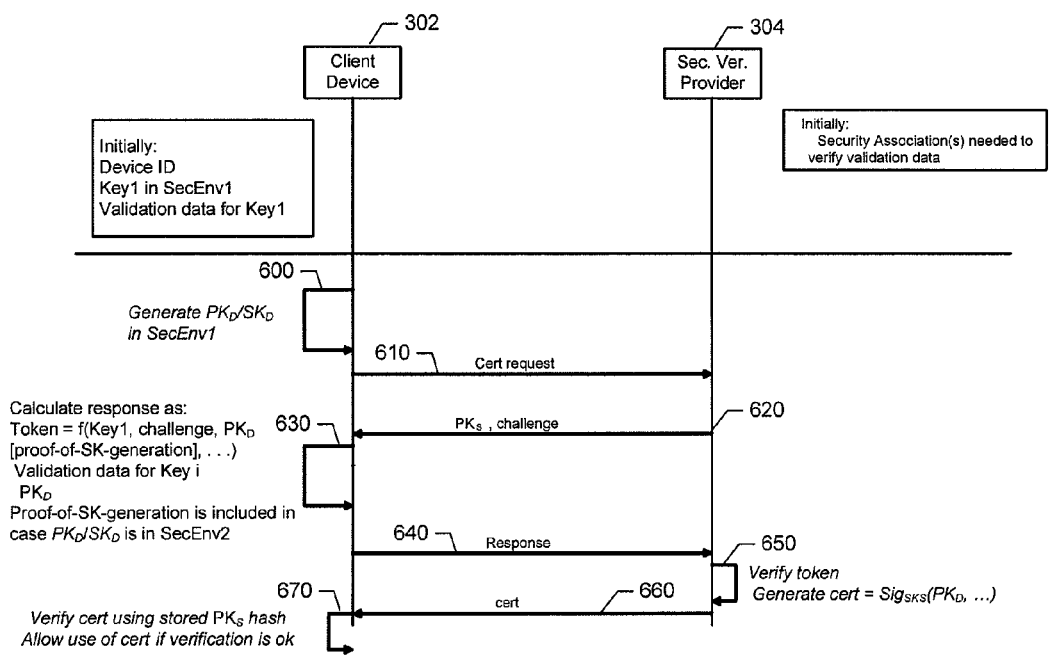

FIGS. 4-6 are signaling diagrams illustrating communications that may occur while bootstrapping device and user authentication according to exemplary embodiments of the present invention. In this regard FIGS. 4-6 are signaling diagrams illustrating communications between a client device 302 and a security verification provider 304 for issuing a security certificate to a client device 302 according to exemplary embodiments of the present invention. Referring now to FIG. 4, the client device 302 may initially have stored in memory 312 a device identification, a legacy public/private key pair including legacy public key (denoted in the figure as "Key1" and also referred to herein as "$LPK_D$") in a first secure environment ("SecEnv1") known to the security verification provider 304, and validation data for Key1. This validation data may be, for example, a token or certificate issued on Key1. The security verification provider 304 may have pre-stored in memory 322 one or more security associations needed to verify the validation data of the client device 302. These security associations may comprise, for example, a public/private key pair of the security verification provider 304. At operation 400, the device authentication unit 318 of the client device 302 may generate the public/private key pair $PK_D/SK_D$ in SecEnv1. Although illustrated in FIG. 4 as being generated in SecEnv1, it will be appreciated that the client device 302 may have multiple secure environments and $PK_D$ and $SK_D$ may also be calculated in another secure environment of the client device 302, referred to as SecEnv2. The device authentication unit 318 may then send a security certificate request to the security verification provider 304 at operation 410. The device authentication unit 318 may send the security certificate request automatically, at the request of a user of the client device 302, and/or at the request of a remote device, such as the security verification provider 304.

The security certificate generation unit 328 may then send a challenge to the client device 302 at operation 420. The device authentication unit 318 may then calculate a response to the challenge by calculating a validation token. The validation token may be calculated, for example, as a function of one or more of Key1, the received challenge, and/or $PK_D$. The validation token may be further calculated based upon proof of $SK_D$ generation in instances in which $PK_D$ and $SK_D$ are generated in SecEnv2. The device authentication unit 318 may then send a response comprising the calculated validation token to the security verification provider 304 at operation 440. The security certificate generation unit 328 may then verify the validation token and generate a security certificate based at least in part upon $PK_D$ and sign the certificate using a private key ("$SK_S$") of the security verification provider 304 at operation 450. Operation 460 may then comprise the security verification provider sending the generated security certificate to the client device 302.

Referring now to FIG. 5, another signaling diagram illustrating communications between a client device 302 and a security verification provider 304 for issuing a security certificate to a client device 302 according to another exemplary embodiment of the invention is illustrated. The initial states and operations 500-510 are substantially the same as the initial states and operations 400-410 as described above in connection with FIG. 4. Operation 520 may differ from operation 420 in that the security certificate generation unit 328 may send the public key $PK_S$ of the security verification provider 304 as a parameter of the challenge to the client device 302. At operation 530, the device authentication unit 318 may, in addition to calculating a response to the challenge as described above in connection with operation 430, verify $PK_S$ and encrypt the response message comprising the calculated validation token using $PK_S$. The device authentication unit 318 may then send the encrypted response to the security verification provider 304 at operation 540. Encrypting the challenge response using $PK_S$ may ensure that only a designated trusted security verification provider can issue a security certificate. At operation 550, the security certificate generation unit 328 may decrypt the received response, verify the validation token, and generate a security certificate. The security certificate generation unit 328 may then send the generated security certificate to the client device 302 at operation 460.

Referring now to FIG. 6, another signaling diagram illustrating communications between a client device 302 and a security verification provider 304 for issuing a security certificate to a client device 302 according to another exemplary embodiment of the invention is illustrated. The initial states and operations 600-610 are substantially the same as the initial states and operations 400-410 as described above in connection with FIG. 4. At operation 620, the security certificate generation unit 328 may send the public key $PK_S$ of the security verification provider 304 as a parameter of the challenge to the client device 302. Operation 630 may comprise the device authentication unit 318 calculating a validation token in response to the received challenge as described above in connection with operation 430 of FIG. 4. At operation 640, the device authentication unit may send a response to the challenge to the security verification provider 304. The security certificate generation unit 328 may then verify the received validation token and generate a security certificate at operation 650. Operation 660 may comprise the security certificate generation unit 328 sending the generated security certificate to the client device 302. At operation 670, the device authentication unit 318 may verify the received security certificate using a stored representation of $PK_S$, such as, for example, a hash of $PK_S$. The device authentication unit 318 may then allow the use of the security certificate and/or the key pair $PK_D/SK_D$ only if the device authentication unit 318 properly verifies the security certificate. In this regard, the embodiment illustrated in FIG. 6 may receive a security certificate issued by any security verification provider 304, but may only use a security certificate issued by a known and trusted security verification provider 304.

Figure 7:
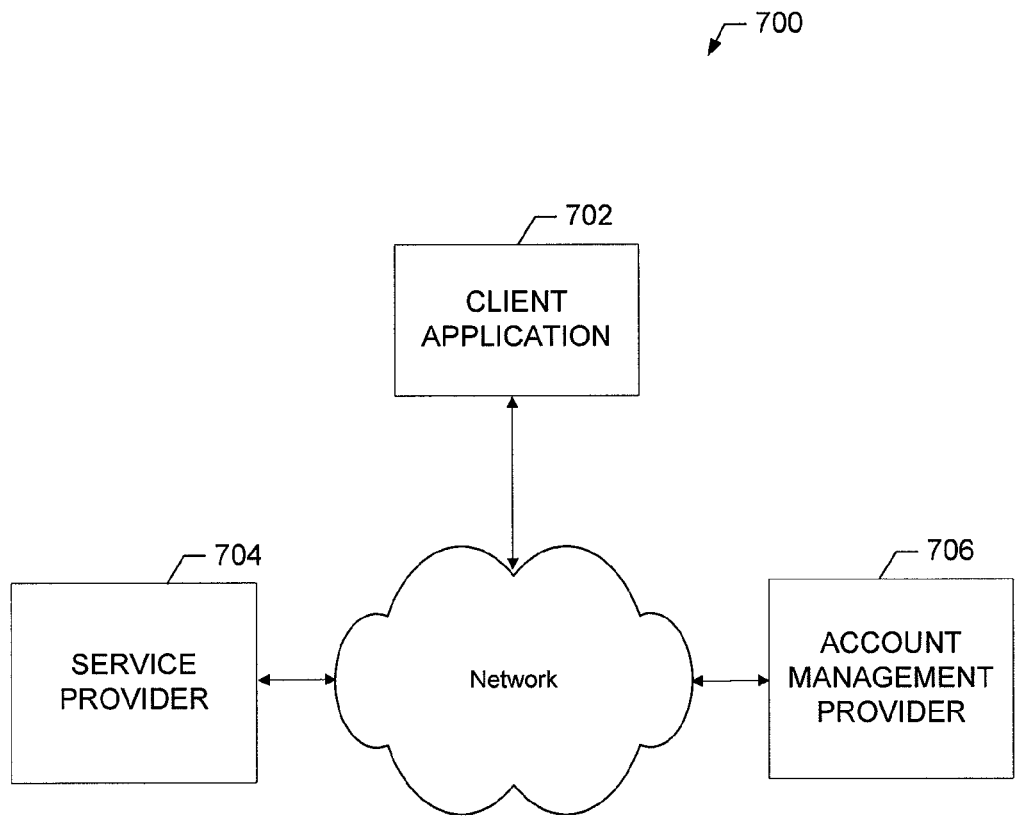
FIGS. 7-8 illustrate exemplary embodiments of systems that may use embodiments of the present invention.
Figure 8:
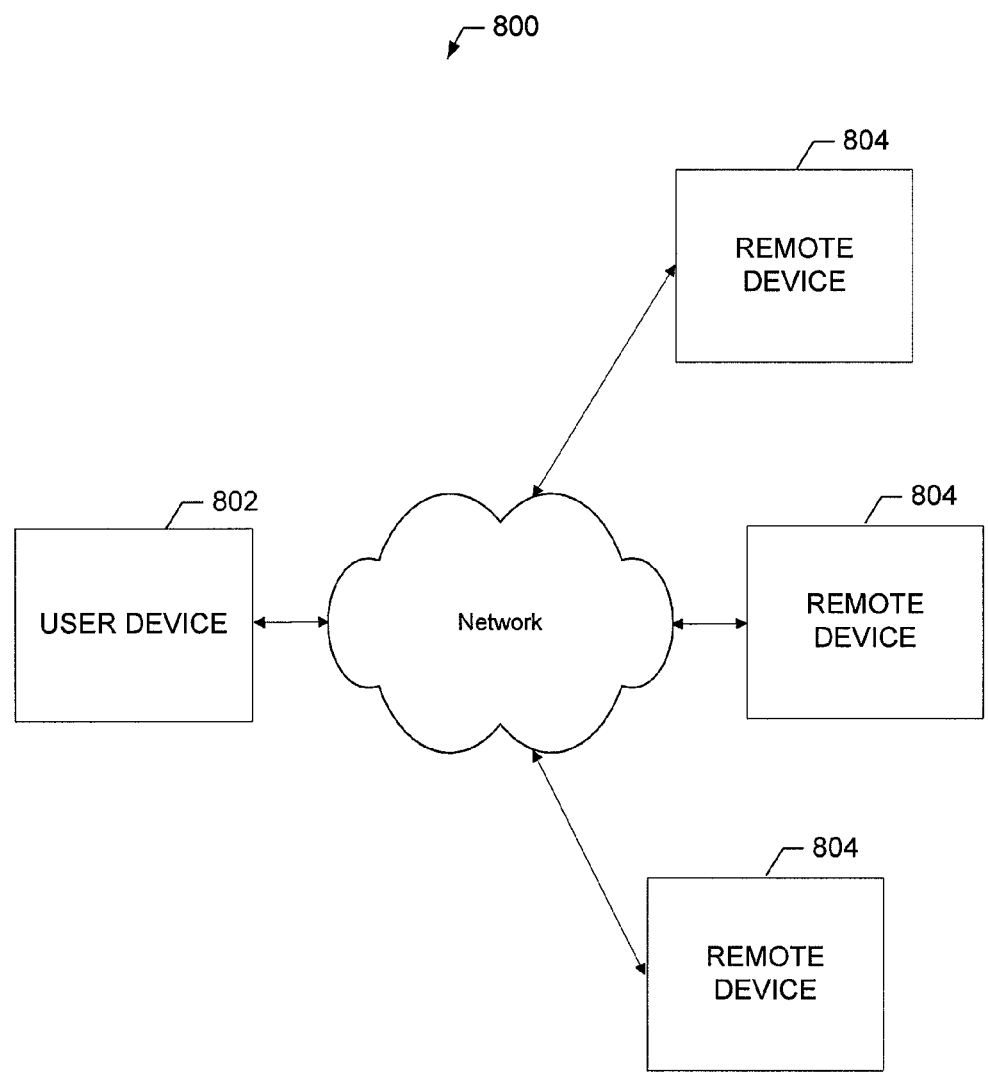

FIGS. 7 and 8 illustrate exemplary embodiments of systems that may use embodiments of the present invention. FIG. 7 illustrates a system 700 comprising a client application 702, service provider 704, and an account management provider 706 in communication over a network. The client application 702 may be embodied on a client device 302 and may be any software or hardware based application, such as, for example, a web browser application, configured to access a service over a network. The service provider 704 may be any computing device configured to provide a service to a client application 702. The account management provider 706 may include a client authentication unit 330 and may optionally further serve as a security verification provider 304. A user using the client application 702 may request a service provided by the service provider 704. The client application 702 may then either directly or indirectly via the service provider 704 authenticate itself to the account management provider 706 using $PK_D$ and/or a security certificate issued thereon. The client authentication unit 330 of the account management provider 706 may retrieve a stored service username and password combination linked to $PK_D$ and send the username and password combination to the service provider 704 so that the user of the client application 702 may access his service user account from the service provider 704.

FIG. 8 illustrates a system 800 comprising a user device 802 in communication with a plurality of remote devices 804 over a network. The network of the system 800 may, for example, be an ad hoc network and the user device 802 may communicate with remote devices 804 using, for example, IEEE 802.11 or Bluetooth protocols. The user device 802 may comprise a client authentication unit 330 and a memory. The user device 802 may have a plurality of remote device verification data such as public keys, security certificates, and/or service user account identifiers associated therewith stored in the memory. In this regard, the stored remote device verification data may comprise indications of users and/or remote devices 804 trusted by the user device 802. Accordingly, when a remote device 804 requests access to content stored on or a service provided by the user device 802 in an ad hoc peer-to-peer setting, the client authentication unit 330 of the user device 802 may determine an identity of a user of the remote device 804 and verify that the user is trusted prior to providing access to the requested content or service.

Figure 9:
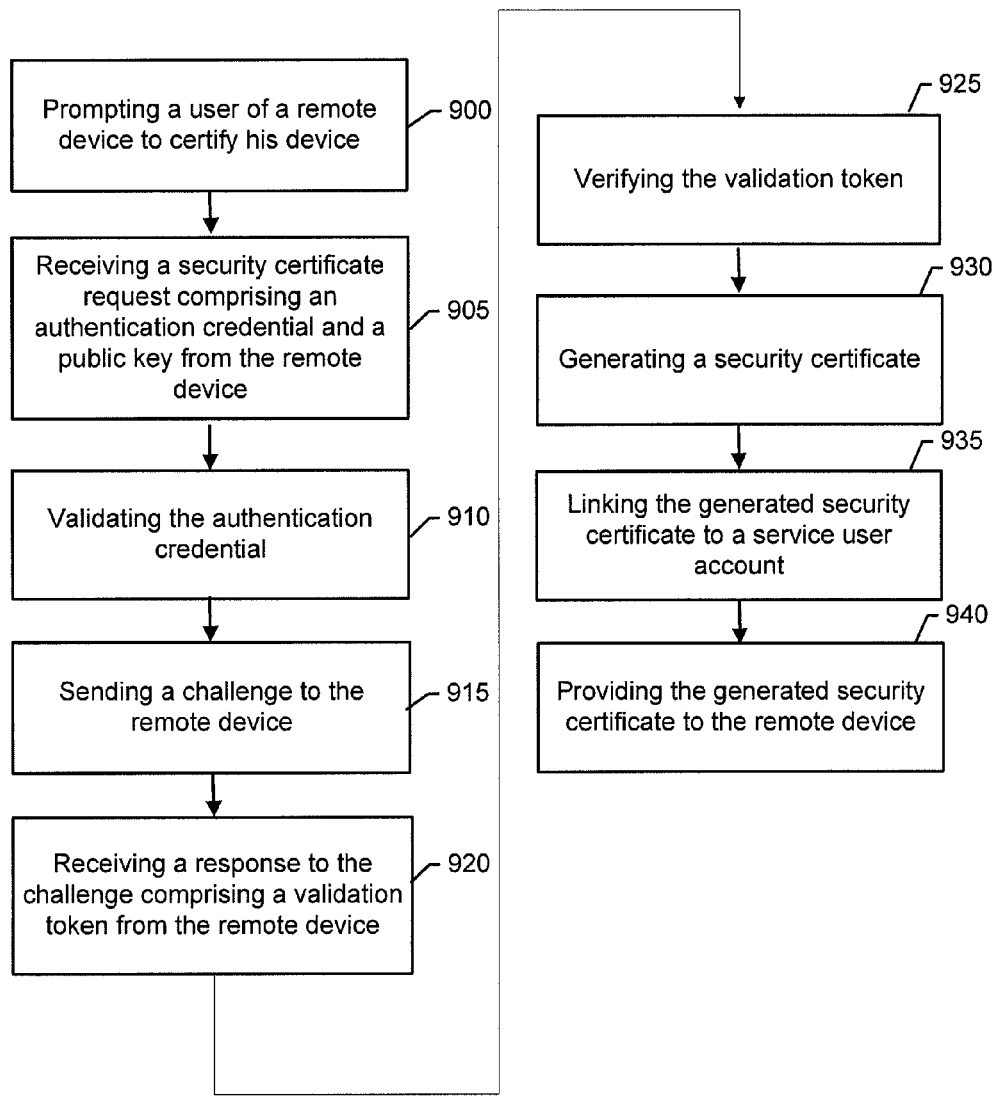
FIG. 9 is a flowchart according to an exemplary method for providing for bootstrapping of device and user authentication according to an exemplary embodiment of the present invention.
Figure 10:
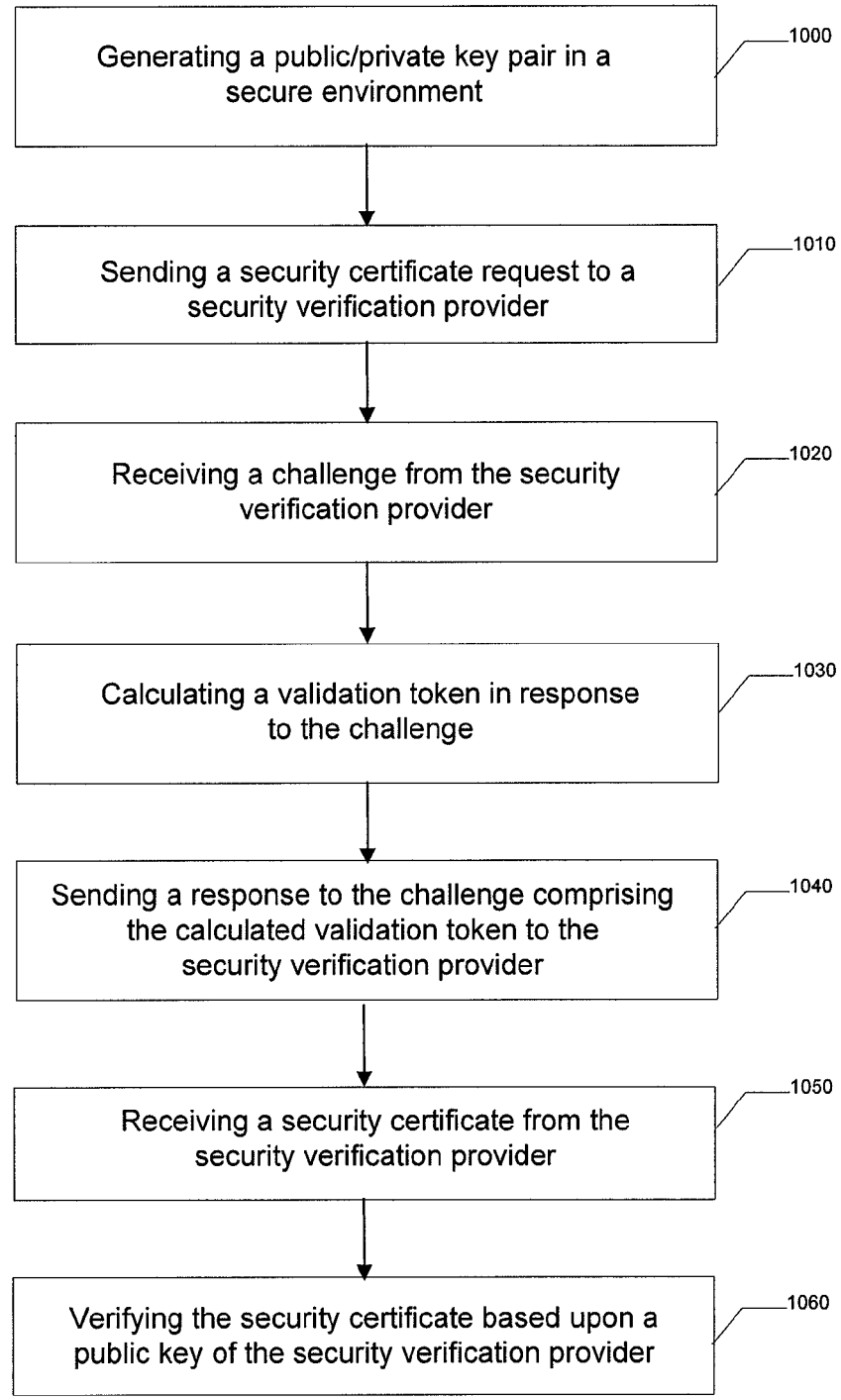
FIG. 10 is a flowchart according to an exemplary method for providing for bootstrapping of device and user authentication according to an exemplary embodiment of the present invention.
Figure 11:
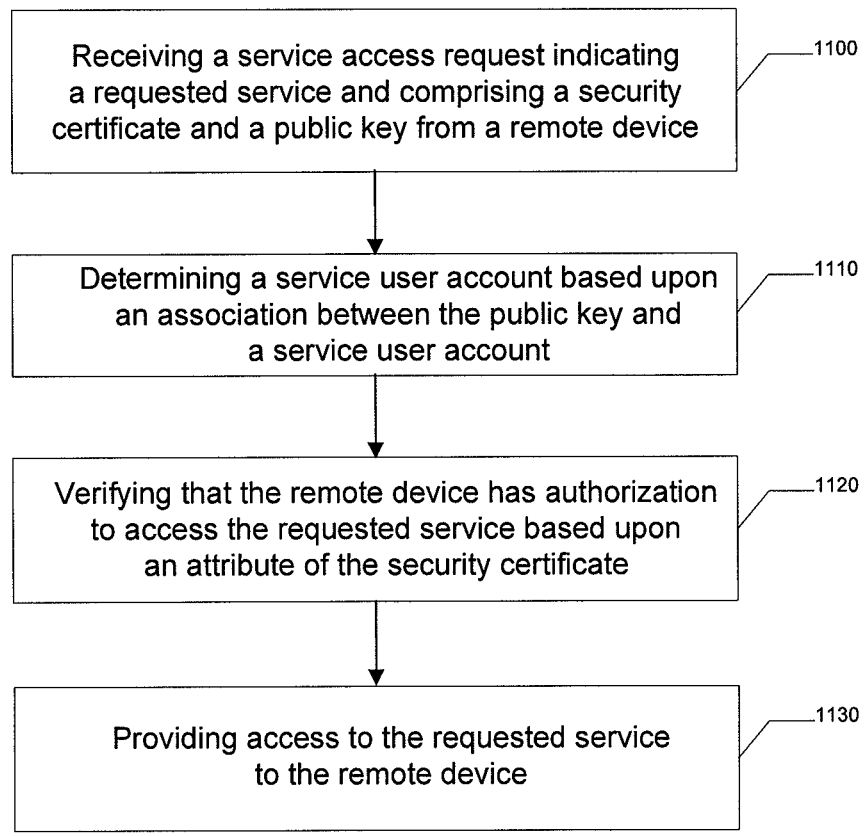
FIG. 11 is a flowchart according to an exemplary method for authenticating a user by bootstrapping device and user authentication according to an exemplary embodiment of the present invention.

FIGS. 9-11 are flowcharts of a system, method, and computer program product according to an exemplary embodiment of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a built-in processor in the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one exemplary method for providing for bootstrapping of device and user authentication according to an exemplary embodiment of the present invention is illustrated in FIG. 9. FIG. 9 illustrates operations that may occur at a security verification provider 304. The method may optionally include the security certificate generation unit 328 prompting a user of a remote device, such as a client device 302, to certify his device at operation 900. This prompting may occur, for example, when a user of a new client device 302 first powers his device and connects to a security verification provider 304 or alternatively may occur at any point when the client device 302 does not have a valid security certificate. Operation 905 may comprise the security certificate generation unit 328 receiving a security certificate request comprising an authentication credential and a public key from the remote device. Operation 905 may occur in response to the prompting of operation 900 or may occur unprompted at the initiative of a user of a remote device. The security certificate generation unit 328 may then validate the received authentication credential at operation 910. Operation 915 may optionally comprise the security certificate generation unit 328 sending a challenge to the remote device. In embodiments where the security certificate generation unit sends a challenge, the security certificate generation unit 328 may receive a response comprising a validation token at operation 920 and may subsequently verify the validation token at operation 925. Operation 930 may comprise the security certificate generation unit 328 generating a security certificate. The security certificate generation unit 328 may then link the generated security certificate to a service user account at operation 935. Operation 940 may comprise the security certificate generation unit 328 providing the generated security certificate to the remote device.

FIG. 10 illustrates an exemplary method for providing for bootstrapping of device and user authentication according to an exemplary embodiment of the present invention and is from the perspective of a client device 302. In this regard, operation 1000 may comprise the device authentication unit 318 generating a public/private key pair ($PK_D/SK_D$) in a secure environment. The device authentication unit 318 may then send a security certificate request to a security verification provider 304 at operation 1010. Operation 1010 may occur, for example, at the request of a user of the client device 302, in response to a prompt from the security verification provider 304, or automatically, such as when the client device 302 does not have a valid security certificate. The device authentication unit 318 may then receive a challenge from the security verification provider 304 at operation 1020 and may calculate a validation token in response to the challenge at operation 1030. Operation 1040 may comprise the device authentication unit 318 sending a response to the challenge comprising the calculated validation token to the security verification provider 304. The device authentication unit 318 may then receive a security certificate from the security verification provider 304 at operation 1050. Operation 1060 may optionally comprise the device authentication unit 318 verifying the received security certificate based upon a public key of the security verification provider 304.

FIG. 11 illustrates an exemplary method for authenticating a user by bootstrapping device and user authentication according to an exemplary embodiment of the present invention. In this regard, operation 1100 may comprise the client authentication unit 330 receiving a service access request indicating a requested service and comprising a security certificate and a public key from a remote device, such as a client device 302. The client authentication unit 330 may then determine a service user account based upon an association between the public key and a service user account at operation 1110. Operation 1120 may comprise the client authentication unit 330 verifying that the remote device has authorization to access the requested service based upon an attribute of the security certificate. The client authentication unit 330 may then provide access to the requested service to the remote device at operation 1130. The extent of the access provided may be based, for example, upon an attribute of the security certificate that defines a scope or extent of service access permissions enabled by the security certificate.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for bootstrapping device and user authentication. Accordingly, a legacy authentication mechanism of a computing device may be leveraged to provide for secure user credentialing and automatic user authentication. Once a user device has been credentialed by providing the device with a security certificate issued on a public key and linking the public key with a service user account, the device may be automatically authenticated to a service upon requesting access to the service. This automatic authentication may be transparent to the user and may not require the user to remember and enter a service username and password upon each access of a service.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving a security certificate request from a remote device comprising a public key of the remote device and an authentication credential based upon a legacy authentication mechanism of the remote device, wherein the security certificate request is generated using one or more of a legacy public key or a legacy secure key associated with the legacy authentication mechanism, and wherein the legacy public key and the legacy secure key are different from the public key;
validating, using a processor, the received authentication credential in accordance with the legacy authentication mechanism;
generating a security certificate for the public key in response to validating the received authentication credential; and
causing the generated security certificate to be provided to the remote device.

2. A method according to claim 1, wherein validating the received authentication credential comprises one or more of validating that the remote device is a compliant device, validating that the public key matches a representation in parameters covered by the legacy authentication mechanism, or validating that the public key was generated in a secure environment of the remote device.

3. A method according to claim 1, wherein generating a security certificate comprises generating a security certificate comprising:
an attribute specifying a model of the remote device;
an attribute specifying a security level of the public key; and
an attribute specifying one or more use permissions of the security certificate.

4. A method according to claim 1, further comprising:
sending a challenge to the remote device;
receiving, in response to the challenge, a validation token comprising proof that the public key was generated in a secure environment of the remote device; and
verifying the received validation token.

5. A method according to claim 1, further comprising storing in a memory an association between the public key and a service user account.

6. A method according to claim 1, wherein receiving a security certificate request further comprises receiving an indication of a service user account; and
further comprising linking the generated security certificate to the service user account.

7. A method according to claim 6, wherein linking the generated security certificate to the service user account comprises storing a reference to the public key of the remote device in association with the service user account.

8. A method according to claim 1, further comprising
receiving a service access request from the remote device, wherein the service access request indicates a requested service and comprises the generated security certificate and the public key of the remote device;
determining a service user account based upon an association between the public key and a service user account;
verifying authorization to access the requested service based upon an attribute of the security certificate; and
providing access to the requested service to the remote device.

9. A method according to claim 1, further comprising prompting a user of the remote device to certify the remote device.

10. A method according to claim 9, wherein receiving a security certificate request comprises receiving a security certificate request from the remote device in response to the prompting of the user.

11. A method according to claim 9, wherein prompting the user comprises a security verification provider prompting the user when the remote device first connects to the security verification provider.

12. A method according to claim 9, further comprising:
determining whether the remote device is certified by a security verification provider; and
wherein prompting the user comprises the security verification provider prompting the user based at least in part upon a determination that the remote device is not certified by the security verification provider.

13. A method according to claim 1, further comprising:
querying a user of the remote device whether the user wishes to link the generated security certificate to a service user account; and
linking the generated security certificate to the service user account if the user indicates a desire to link the generated security certificate to the service user account in response to the query.

14. A computer program product embedded on at least one non-transitory computer-readable storage medium having computer-readable program code portions stored therein, the computer-readable program code portions comprising:
a first program code portion for receiving a security certificate request from a remote device comprising a public key of the remote device and an authentication credential based upon a legacy authentication mechanism of the remote device, wherein the security certificate request is generated using one or more of a legacy public key or a legacy secure key associated with the legacy authentication mechanism, and wherein the legacy public key and the legacy secure key are different from the public key;
a second program code portion for validating the received authentication credential in accordance with the legacy authentication mechanism;
a third program code portion for generating a security certificate for the public key in response to validating the received authentication credential; and
a fourth program code portion for causing the generated security certificate to be provided to the remote device.

15. A computer program product according to claim 14, wherein the second program code portion includes instructions for one or more of:
validating that the remote device is a compliant device;
validating that the public key matches a representation in parameters covered by the legacy authentication mechanism; or
validating that the public key was generated in a secure environment of the remote device.

16. A computer program product according to claim 14, wherein the third program code portion includes instructions for generating a security certificate comprising an attribute specifying a model of the remote device, an attribute specifying a security level of the public key, and an attribute specifying one or more use permissions of the security certificate.

17. A computer program product according to claim 14, further comprising:
a fifth program code portion for sending a challenge to the remote device;
a sixth program code portion for receiving, in response to the challenge, a validation token comprising proof that the public key was generated in a secure environment of the remote device; and
a seventh program code portion for verifying the received validation token.

18. A computer program product according to claim 14, further comprising a fifth program code portion for storing in a memory an association between the public key and a service user account.

19. A computer program product according to claim 14, wherein the first program code portion includes instructions for receiving an indication of a service user account and further comprising a fifth program code portion for linking the generated security certificate to the service user account.

20. A computer program product according to claim 19, wherein the fifth program code portion includes instructions for storing a reference to the public key of the remote device in association with the service user account.

21. A computer program product according to claim 14, further comprising:
a fifth program code portion for receiving a service access request from the remote device, wherein the service access request indicates a requested service and comprises the generated security certificate and the public key of the remote device;
a sixth program code portion for determining a service user account based upon an association between the public key and a service user account;
a seventh program code portion for verifying authorization to access the requested service based upon an attribute of the security certificate; and
an eighth program code portion for providing access to the requested service to the remote device.

22. A computer program product according to claim 14, further comprising a fifth program code portion for prompting a user of the remote device to certify the remote device.

23. A computer program product according to claim 22, wherein the first program code portion includes instructions for receiving a security certificate request from the remote device in response to the prompting of the user.

24. A computer program product according to claim 22, wherein the fifth program code portion includes instructions for prompting the user when the remote device first connects to a security verification provider.

25. A computer program product according to claim 22, further comprising:
a sixth program code portion for determining whether the remote device is certified by a security verification provider; and wherein the fifth program code portion includes instructions for prompting the user based at least in part upon a determination that the remote device is not certified by the security verification provider.

26. A computer program product according to claim 14, further comprising:
a fifth program code portion for querying a user of the remote device whether the user wishes to link the generated security certificate to a service user account; and
a sixth program code portion for linking the generated security certificate to the service user account if the user indicates a desire to link the generated security certificate to the service user account in response to the query.

27. An apparatus comprising at least one processor and at least one memory storing computer program code, wherein the at least one memory and stored computer program code are configured, with the at least one processor, to cause the apparatus to at least:
receive a security certificate request from a remote device comprising a public key of the remote device and an authentication credential based upon a legacy authentication mechanism of the remote device, wherein the security certificate request is generated using one or more of a legacy public key or a legacy secure key associated with the legacy authentication mechanism, and wherein the legacy public key and the legacy secure key are different from the public key;
validate the received authentication credential in accordance with the legacy authentication mechanism;
generate a security certificate for the public key in response to validating the received authentication credential; and
cause the generated security certificate to be provided to the remote device.

28. An apparatus according to claim 27, wherein the processor is further configured to validate the received authentication credential by one or more of:
validating that the remote device is a compliant device;
validating that the public key matches a representation in parameters covered by the legacy authentication mechanism; or
validating that the public key was generated in a secure environment of the remote device.

29. An apparatus according to claim 27, wherein the processor is further configured to generate a security certificate by generating a security certificate comprising:
an attribute specifying a model of the remote device;
an attribute specifying a security level of the public key; and
an attribute specifying one or more use permissions of the security certificate.

30. An apparatus according to claim 27, wherein the processor is further configured to:
send a challenge to the remote device;
receive, in response to the challenge, a validation token comprising proof that the public key was generated in a secure environment of the remote device; and
verify the received validation token.

31. An apparatus according to claim 27, further comprising a memory for storing an association between the public key and a service user account.

32. An apparatus according to claim 27, wherein the processor is further configured to receive an indication of a service user account with the security certificate request and to link the generated security certificate to the service user account.

33. An apparatus according to claim 32 wherein the processor is further configured to link the generated security certificate to the service user account by storing a reference to the public key of the remote device in association with the service user account.

34. An apparatus comprising according to claim 27 wherein the processor is further configured to:
receive a service access request from the remote device, wherein the service access request indicates a requested service and comprises the generated security certificate and the public key of the remote device;
determine a service user account based upon an association between the public key and a service user account;
verify authorization to access the requested service based upon an attribute of the security certificate; and
provide access to the requested service to the remote device.

35. An apparatus according to claim 27, wherein the processor is further configured to prompt a user of the remote device to certify the remote device.

36. An apparatus according to claim 35, wherein the processor is further configured to receive a security certificate request from the remote device in response to the prompting of the user.

37. An apparatus according to claim 35, wherein the processor is further configured to prompt the user of the remote device to certify the remote device when the remote device first connects to the security verification provider.

38. An apparatus according to claim 35, wherein the processor is further configured to:
determine whether the remote device is certified by a security verification provider; and
prompt the user of the remote device to certify the remote device based at least in part upon a determination that the remote device is not certified by the security verification provider.

39. An apparatus according to claim 27, wherein the processor is further configured to:
query a user of the remote device whether the user wishes to link the generated security certificate to a service user account; and
link the generated security certificate to the service user account if the user indicates a desire to link the generated security certificate to the service user account in response to the query.

40. An apparatus comprising:
means for receiving a security certificate request from a remote device comprising a public key of the remote device and an authentication credential based upon a legacy authentication mechanism of the remote device, wherein the security certificate request is generated using one or more of a legacy public key or a legacy secure key associated with the legacy authentication mechanism, and wherein the legacy public key and the legacy secure key are different from the public key;
means for validating the received authentication credential in accordance with the legacy authentication mechanism;
means for generating a security certificate for the public key in response to validating the received authentication credential; and
means for causing the generated security certificate to be provided to the remote device.

* * * * *